US007853766B2

(12) United States Patent
Lindner et al.

(10) Patent No.: US 7,853,766 B2
(45) Date of Patent: Dec. 14, 2010

(54) METHOD AND SYSTEM FOR AUTOMATED MIGRATION OF MEDIA ARCHIVES

(75) Inventors: James A. Lindner, New York, NY (US); Ralph Justin Davila, New York, NY (US)

(73) Assignee: Samma Systems, LLC, Louisville, CO (US)

( * ) Notice: Subject to any disclaimer, the term of this patent is extended or adjusted under 35 U.S.C. 154(b) by 0 days.

(21) Appl. No.: 11/958,015

(22) Filed: Dec. 17, 2007

(65) Prior Publication Data

US 2008/0162606 A1 Jul. 3, 2008

Related U.S. Application Data

(63) Continuation of application No. 11/166,939, filed on Jun. 24, 2005, now abandoned.

(60) Provisional application No. 60/583,172, filed on Jun. 25, 2004.

(51) Int. Cl.
G06F 12/00 (2006.01)
(52) U.S. Cl. .............................. 711/162; 711/E12.001; 714/5; 714/42
(58) Field of Classification Search ...................... None
See application file for complete search history.

(56) References Cited

U.S. PATENT DOCUMENTS

| 4,338,391 A | * | 7/1982 | Nacci et al. | ..................... | 430/39 |
| 5,048,142 A | * | 9/1991 | Stone | .......................... | 15/97.1 |
| 5,122,873 A | | 6/1992 | Golin | | |
| 5,152,028 A | * | 10/1992 | Hirano | ......................... | 15/319 |
| 5,157,511 A | | 10/1992 | Kawai et al. | | |
| 5,377,051 A | | 12/1994 | Lane et al. | | |

(Continued)

FOREIGN PATENT DOCUMENTS

EP 0912063 4/1999

(Continued)

OTHER PUBLICATIONS

Anonymous. "DVD X Rescue—Your DVD repair Doctor is in!". [online], Dec. 5, 2003 [retrieved on Jun. 1, 2007]. Retrieved from the Internet <URL:http://web.archive.org/web/20031205150548/http://www.dvd-x-rescue.com>.*

(Continued)

*Primary Examiner*—Reginald G Bragdon
*Assistant Examiner*—Larry T Mackall
(74) *Attorney, Agent, or Firm*—Neugeboren O'Dowd PC

(57) ABSTRACT

A method and system for effectively and rapidly migrating recorded content from one storage-media to a second storage-media. The method and system includes an operator and a robotic handler with multiple processing and analytical tools where the operator loads the storage-media into the robotic handler and ensures each storage-media is placed in an efficient order as determined by the system. The system retrieves the storage-media from the input bay and places it into an appropriate playback deck; migrates the recorded data to one or more destination storage-media in accordance with the established parameters; analyzes the timing, video signal, and audio signal of the storage-media; and periodically calibrates its internal to consistently calibrated quality control.

20 Claims, 6 Drawing Sheets

U.S. PATENT DOCUMENTS

| | | | |
|---|---|---|---|
| 5,546,191 A | 8/1996 | Hibi et al. | |
| 5,684,714 A | 11/1997 | Yogeshwar et al. | |
| 5,764,972 A | 6/1998 | Crouse et al. | |
| 5,969,755 A | 10/1999 | Courtney | |
| 6,031,939 A | 2/2000 | Gilbert et al. | |
| 6,100,940 A | 8/2000 | Dieterich | |
| 6,115,035 A | 9/2000 | Compton et al. | |
| 6,118,925 A | 9/2000 | Murata et al. | |
| 6,185,363 B1 | 2/2001 | Dimitrova et al. | |
| 6,188,428 B1 | 2/2001 | Koz et al. | |
| 6,263,313 B1 | 7/2001 | Milsted et al. | |
| 7,110,664 B2 | 9/2006 | Yogeshwar et al. | |
| 2001/0053236 A1 | 12/2001 | Rhoads | |
| 2002/0069369 A1* | 6/2002 | Tremain | 713/201 |
| 2002/0147881 A1 | 10/2002 | Pudipeddi et al. | |
| 2003/0065898 A1* | 4/2003 | Flamma et al. | 711/165 |
| 2003/0115439 A1* | 6/2003 | Mahalingam et al. | 712/1 |
| 2003/0204856 A1* | 10/2003 | Buxton | 725/120 |
| 2004/0044842 A1* | 3/2004 | Trimmer et al. | 711/111 |
| 2004/0117429 A1 | 6/2004 | Karaoguz et al. | |
| 2005/0044451 A1* | 2/2005 | Fry et al. | 714/38 |

FOREIGN PATENT DOCUMENTS

| | | |
|---|---|---|
| EP | 0919952 | 6/1999 |
| WO | WO9735312 | 9/1997 |
| WO | 98/21688 | 5/1998 |

OTHER PUBLICATIONS

Anonymous. "LTO Cartridge Tape Cleaner/Inspector", [online], Jan. 21, 2004 [retrieved on Jun. 4, 2007]. Retrieved from the Internet <URL:http://web.archive.org/web/20040208062142/http://www.bowindustries.com/lto.htm>.*

Gene1219. "Backup process?". [online], Dec. 19, 2003 [retrieved on Jun. 4, 2007]. Retrieved from the Internet <URL://http://dvdxcopy.afterdawn.com/thread_view.cfm/62375>.*

321 Studios. DVD X Rescue. DVD-Burner.ca, [online] Jun. 4, 2004, [retrieved on Mar. 19, 2009]. Retrieved from the Internet <URL:http://web.archive.org/web/20040604060207/http://www.dvd-burner.ca/DVD-X-Rescue.html>.*

John Kohl, et al., "Highlight: Using a Log-structured File System for Tertiary Storage Management", "Proceedings of the Winter USENIX Conference", Jan. 25, 1993, pp. 435-449.

John Kohl, et al., "Highlight: A File System for Tertiary Storage", Apr. 26, 1993, pp. 157-161.

European Patent Office, "Supplementary European Search Report", Oct. 28, 2008.

* cited by examiner

METHOD AND SYSTEM FOR AUTOMATED MIGRATION OF MEDIA ARCHIVES

CROSS REFERENCE TO RELATED APPLICATION(S)

This application is a continuation of application Ser. No. 11/166,939, filed on Jun. 24, 2005, now abandoned, which is hereby incorporated by reference, and which is anon-provisional utility patent application claiming benefit of the filing date of U.S. provisional application Ser. No. 60/583,172 filed Jun. 25, 2004, and titled "Method and System for the Automated Migration of Media Archives," which is hereby incorporated by reference.

BACKGROUND OF THE INVENTION

1. Technical Field

This invention relates to a method and system for migrating storage media.

2. Description of the Prior Art

Magnetic storage media, such as a video cassette recorder (VCR) cassettes or the like, is an inexpensive and convenient medium for recording and preserving large quantities of recorded content. Long-term preservation of the recorded data on magnetic storage media is limited by the integrity of the storage media. Current storage media do not guarantee long-term preservation. Prior methods have been devised to migrate recorded data from a source storage media onto one or more destination storage media with a projected capability of longer-term preservation of data. However, these prior methods are limited in applicability because of high cost and low production output due to the use of specialized techniques that were unable to handle large-scale processing demands.

One prior art solution, utilizes extensive work and migration handlers. For example, each storage media is manually inspected to determine the level of degradation prior to execution of the migration. On average, between 5% and 10% of storage media were actually degraded or required such special needs. Thus, the inspection process added a significant time interval into the entire migration process which is reflected in excessive cost and slow productivity. In this prior art method, the cost of the migration process is estimated to be between $250 to $400 per hour. The reasoning for this estimate is because a specialized facility is used where trained migration technicians examine each storage media. Furthermore, because the migration technicians individually inspect each storage media, migration facilities are limited to, at most, 10,000 migrations per year. At this level of production, the heritage contained on the storage media will disintegrate before it can be migrated and preserved. However, because inspection was necessary to ensure the full efficacy of the migration, it is recommended that there be modification to the process of migration and preservation of storage media while retaining some form of an inspection process.

Therefore, to avoid excessive costs, a migration technique is needed where degraded storage media can be efficiently separated from non-degraded storage media. The process of separating the storage media may include categorizing the storage media based upon the state of degradation. Storage media determined to be in a non-degraded state can be migrated quickly, while storage media determined to be in a degraded state can be given the appropriate additional restoration for possible migration.

SUMMARY OF THE INVENTION

This invention comprises a method and system for automatic migration of recorded content from a source storage media to one or more destination storage media.

In one aspect of the invention, a migration method is provided that identifies defects in the storage media or catalog integrity of recorded content. The storage media without defects is separated from the defective storage media. Additionally, this method cleans the storage media and evaluates the parameters necessary for successful migration. The storage media is then migrated in accordance with these parameters and the success of the migration is evaluated and recorded.

In another aspect of this invention, a migration system is provided. This system includes, but is not limited to, an operator, a robotic handler with an internal barcode scanner, processing software, cleaning equipment, and real-time analysis tools. The operator loads the storage media into the robotic handler and ensures that each item is placed in a specified correct order. Upon receipt of the storage media, the robotic handler verifies the contents of the storage media, cleans and evaluates the storage media's integrity. In accordance with the parameters obtained from the evaluation, the robotic handler initiates migration of the storage media. Upon completion of the migration, all migrated media are checked for successful migration and marked accordingly in a database.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

The system and method for the automated migration of media archives (SAMMA) provides for quick separation of source storage media requiring special needs and massive, consistent, and unattended processing of source storage media. The SAMMA system, hereinafter referred to as the system, makes processing evaluations based on the length (i.e. time) of the source storage media and reviews the sequential order of each storage media to ensure it is the same order recognized by an associated computer. The SAMMA software and cleaning instruments facilitate sorting and removing fragile and degraded source storage media that will require restoration work. All non-degraded source storage media then begins the automated migration process. Using real-time analytical tools, the system establishes the migration parameters for the source storage media and, based on these parameters, the migration begins. Finally, the system utilizes a self-evaluation function to ensure proper migration to the destination storage media and consistency of the system and method.

Technical Details

SAMMA is a robotic system and method containing software and analytical tools to support intelligent decision making during source storage media migration, as well as including a robotic arm for manipulating the storage media. The physical apparatus of SAMMA includes tape decks for playing, cleaning and inspecting, and calibrating storage media, a database for compiling tape metadata, a log of tape migration, and a display apparatus to convey tape data to an operator. In performing tape migration with SAMMA, each source storage media is initially examined by an operator to ensure there are no physical problems with the source storage media and that each source storage media is placed into the robotic handler in the same sequential order as it was entered into an associated computer. Once the source tape is loaded into an appropriate tape deck, manually or through use of a robotic arm, the migration process is automated through computer instructions.

Figure 1A:
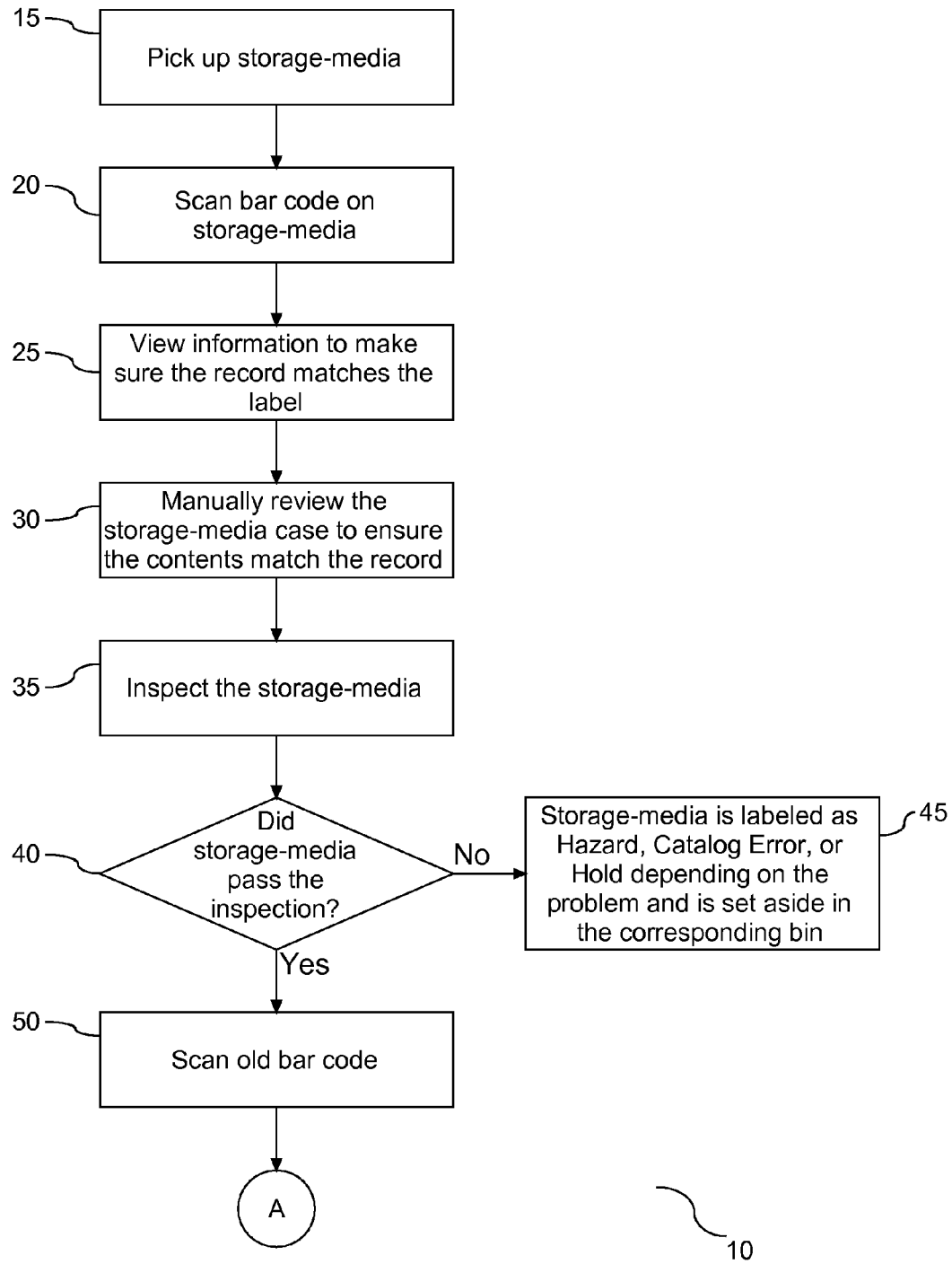
FIGS. 1a and 1b are flow charts illustrating the preparatory steps taken by an operator for source storage media.
Figure 1B:
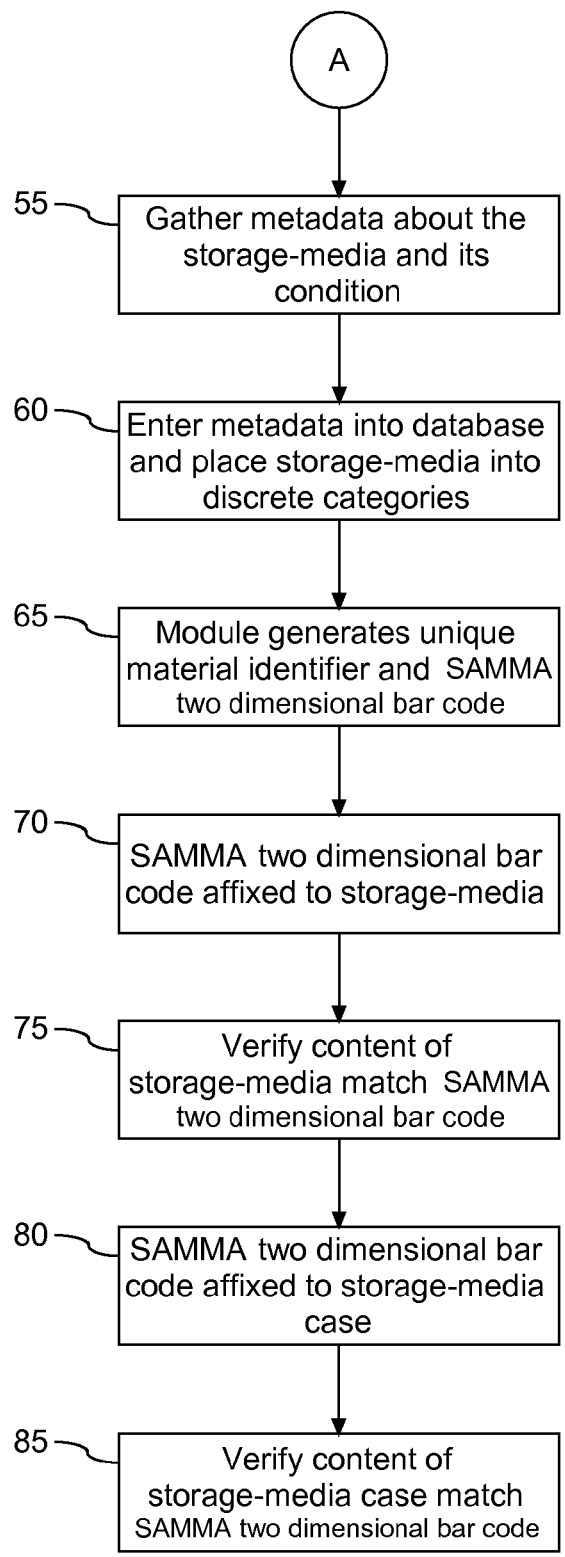

FIG. 1 is a flow chart (10) illustrating the preparation process taken by an operator to set up for auto-migration. Prior to preparation, the operator imports an archive's existing database of source storage media items into the inspection/preparation station. This database is used as a as a reference for the content of labels on storage media. Once the database is imported, the operator then proceeds to the preparation process.

The first step in the preparation process is for the operator to select the source storage media to be migrated from the storage media archive (15). Next, the operator scans the barcode contained on the source storage media case (20) and ensures that the information contained in the operator's database matches the information contained on the source storage media's case (25). Additionally, as a preventative measure, the operator manually reviews the contents of the source storage media to ensure that it matches the information on the source storage media's case (30). If the source storage media is found to match the record, the operator performs a multiple step process to evaluate the source storage media's integrity (35). This inspection process is performed based on training provided with the delivery of the system, and it covers typical observable defects that can disqualify a source storage media item from automatic processing (i.e.: mold, odor, visible particulate matter, cracked cassette, broken door). Based on his/her observations, the operator makes a determination as to whether the storage media passes or fails each inspection step (40). If the storage media fails any step of the inspection, then it does so for one of three reasons (45). First, if there is mold or odor detected on the source storage media, then the source storage media is labeled as a Hazard and fails the inspection process. The Hazard labeled source storage media is then set aside for later processing. Second, if there is a discrepancy with the barcode or label, then the source storage media is labeled as having a Catalog Error and fails the inspection process. The Catalog Error labeled storage media is then set aside for later re-cataloguing by the collection archivist. Examples of catalog errors include an illegible barcode, a barcode that does not match the record, or a source storage media case that does not match the contents of the source storage media. Third, if there are one or more physical or content issues that make the storage media a poor candidate for automated migration, then the storage media is labeled as Hold and fails the inspection process. The Hold labeled storage media is then set aside for later processing.

For all other source storage media, the operator again scans the storage media's barcode (50) and enters the storage media's inspection metadata into the database (55). Entry of the inspection metadata into the database allows the operator to place the source storage media into discrete categories (60). Based on these categories, the database generates a Unique Material Identifier (UMID) for the source storage media and associates the UMID with a two dimensional barcode (65). The UMID barcode is generated and unique for each source media. The UMID barcode is then printed by the operator and affixed to the source storage media (70). Thereafter, the operator scans the UMID barcode on the source media and checks to ensure the physical storage media matches the assigned UMID barcode in the database (75). A second copy of the UMID barcode is then printed by the operator and affixed to the source storage media's case (80). After a successful migration to destination media, the UMID barcode is correlated with the source media. Finally, to complete the migration preparation process, the operator scans the UMID barcode of the source storage media's case to ensure it matches the assigned UMID barcode for the source storage media (85). Accordingly, the final steps of the preparation process require manual oversight of the barcode assignment to each storage media.

Figure 2:
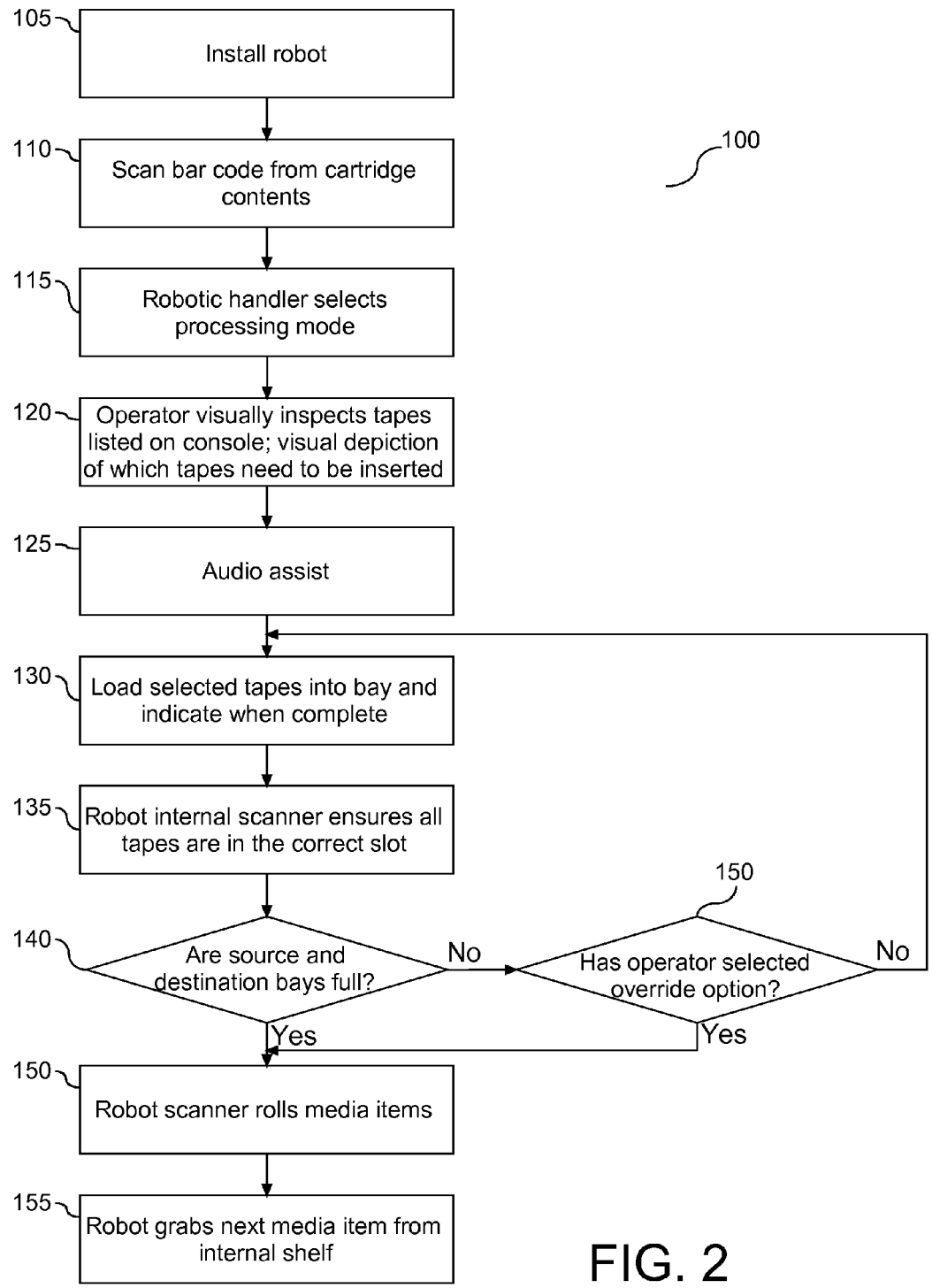
FIG. 2 is a flow chart illustrating the first part of the migration process for source storage media that passed the inspection process.

Once the preparation process is complete, the operator is then able to begin setting up the automated migration process. FIG. 2 is a flow chart (100), illustrating the first part of the migration process for the source storage media that passed the inspection process shown in FIG. 1. The first part of the migration process is also known as the loading process, which is repeated at the beginning of each migration cycle. In the initial step of the loading process, if not already done, the robotic handler and its accompanying software are professionally installed into the associated computer (105). After installation, the robotic handler selects a small sample (or cartfull) of the source storage media from the archive. The sample number is determined by the number of decks in the robotic handler and the total capacity of the robotic handler. Next, the source storage media in the cart are scanned as a group and the source storage media metadata is automatically entered into the system's database as the current local batch (110). This step is also known as the loading step that is done for each migration cycle. In one embodiment, the operator may load the source media. The system then selects a default migration processing mode for the storage media based on information contained within it's database such as time of day, operator work schedule, and the length of the recording on the source storage media (115). The following three factors contribute to mode determination: the number of source tapes, the total capacity of the system, and the frequency of reload of the handler. If the default batch mode is determined to be short (which benefits from having an operator available for frequent loading operations), then the system selects a Normal Mode operation for processing short storage media. The Normal Mode allows the system to migrate multiple storage media in rapid succession; however, it requires the operator to be present with greater frequency to load and unload the storage media to and from the system. If the default batch mode is determined to be long, then the system selects the Extended Mode operation for processing big storage media. The Extended Mode requires greater time to process multiple tapes in succession, and an operator is required with less frequency once the auto-migration begins. The entry and mode selection process is repeated for each migration cycle (typically a "cartfull") of source storage media designated for migration.

After the system selects the default migration processing mode, the operator visually inspects the sequential order of the source storage media listed on a computer display screen of the system (120). As each source storage media is identified by the operator, the UMID barcode is scanned by the operator and an audio signal informs the operator that the UMID barcode has been scanned and that the storage media may be loaded (125). The operator then loads the source storage media into the system's input/output (I/O) bay and indicates then the load has been completed (130). Next, the system internally scans each source storage media's UMID barcode to ensure that the correct items were inserted (135). In one embodiment, the status of each loaded and scanned media item can be displayed on an output device that will indicate the status of the media. The order of items can be re-adjusted by the system automatically. Then, the operator inspects the system's bay to see if the internal library of the system for the source and destination bays is full (140). If the bay is not full, then a query is conducted to determine if the operator has selected to over-ride the option of completing the migration without full bays (145). A negative response to the query at step (145) will result in a return to step (130) so that the operator may continue to load the storage media into the system until the bay is full. Following a positive response to the test at step (145) or an indication that the bay is full from a positive response to the test at step (140), the internal scanner begins to scan the source storage media (150). Finally, the system is ready to begin the automated migration process and selects the first source storage media from its internal shelf (155). The steps outlined in FIG. 2 are the steps the operator and robotic handler take to load and reload storage media for auto-migration to stable storage media. The steps outlined herein may be applied repetitively for volumes of source storage media. Accordingly, the first part of the migration process provides control mechanisms to ensure proper loading of storage media into the bays of the system.

Figure 3:
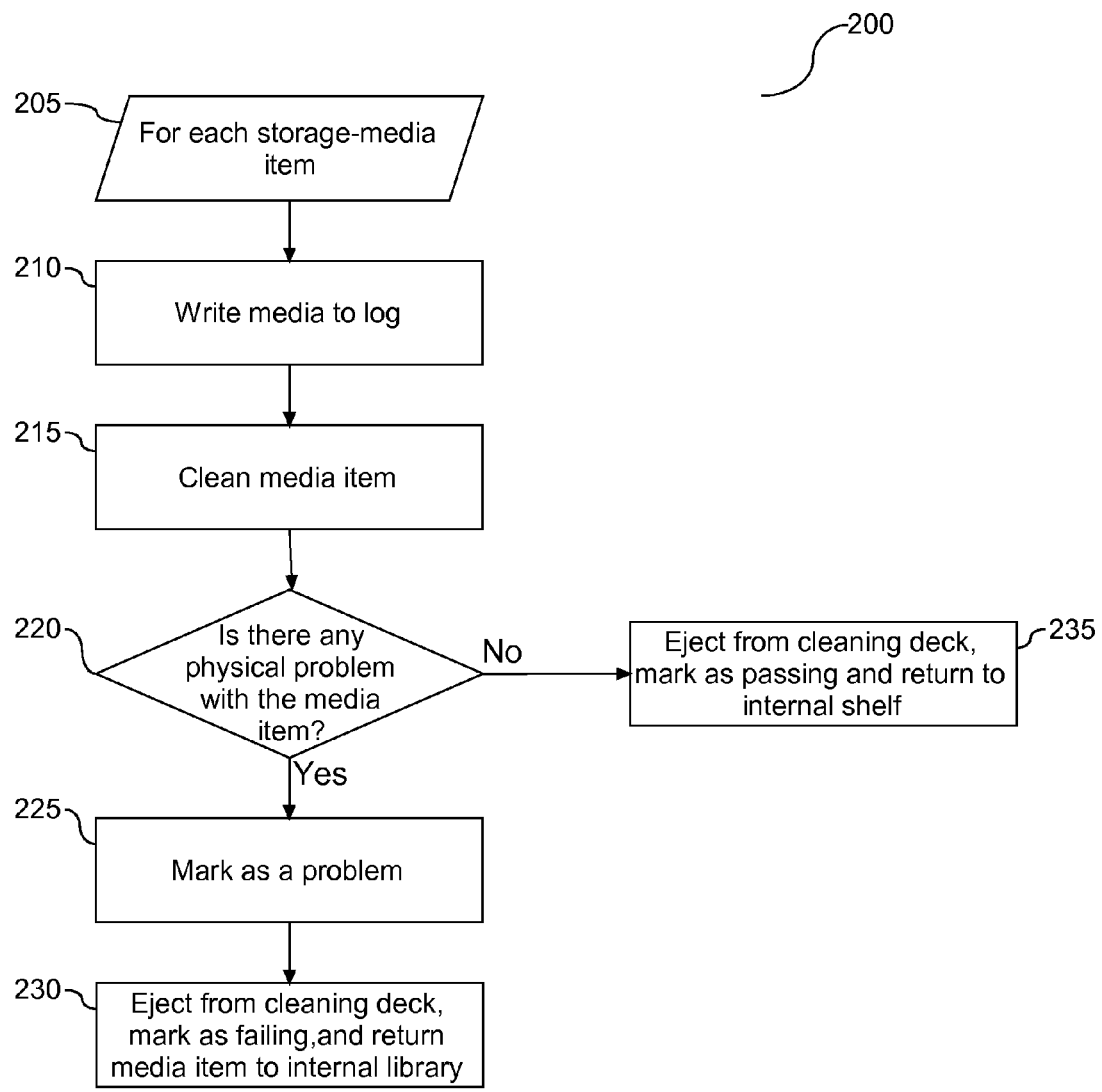
FIG. 3 is a flow chart illustrating the auto-migration process.

FIG. 3 is a flow chart (200) depicting the second part of the migration process known as the auto-migration process. After the source storage media has been selected by the system, metadata for each storage media (205) is written into the system log (210). In one embodiment, the system log is a relational database that captures real-time information about the migration process. As soon as the source media begins migration, the log begins capturing metadata. Next, the system utilizes a custom, high-speed cleaner to clean the source storage media (215). During the cleaning process, the source storage media is removed from the library and placed into a cleaning unit. The cleaning unit includes a sensor to inspect the run of the source media, determine particulate matter levels and defects coming from the media, automatically adjust the speed of the cleaning tissue to clean the tape based on the particulate matter level, and report any change in the speed of the cleaning tissue as metadata. The cleaner also utilizes a non-abrasive Pellon tissue to remove particulate matter, dust, and oxides from the storage media, and it includes a condition sensor to inspect the source storage media for physical problems (220). Such physical problems may include, but are not limited to, scratches, tears, crinkles, breaks, hubs locked, and tissue out. The condition sensor detects problems on the surface of the source media faster than real-time. In one embodiment the condition sensor detects problems of up to five times the play speed. If it is determined during the cleaning inspection that there is a physical problem, then the system marks the source storage media as a problem which disqualifies the item from automated migration, but still makes it available for manual migration (225). All disqualified source media are ejected from the cleaning deck, marked as failed, and returned to the library shelf (230). However, if the system determines that there are no physical problems, then the source storage media is ejected from the cleaning deck, marked as passed, and returned to the library shelf for automated migration (235). The cleaning cycle continues for each tape in the library. As tapes pass the cleaning process and are returned to the library, these tapes may begin the migration process as other tapes continue in the cleaning cycle.

Figure 4:
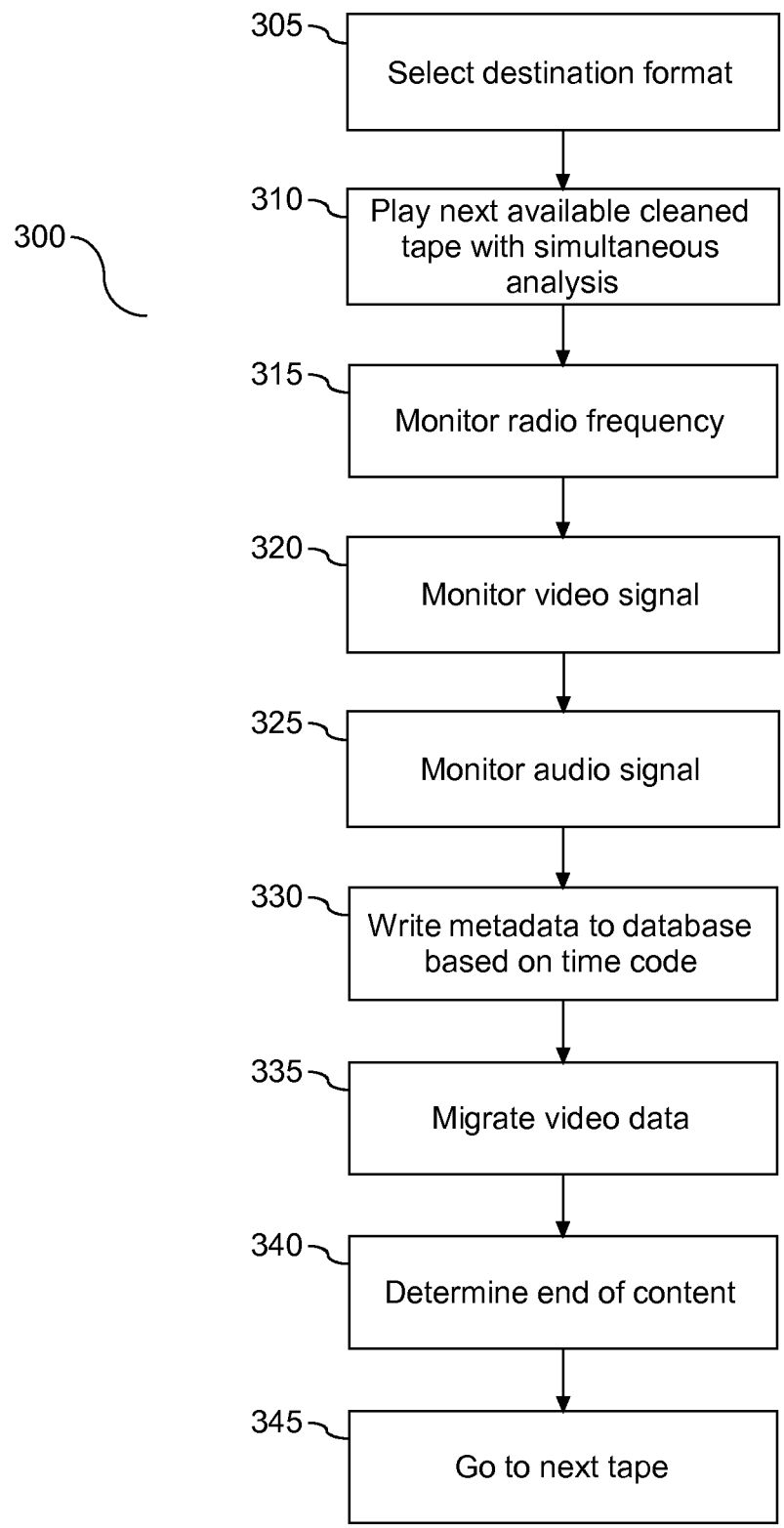
FIG. 4 is a flow chart illustrating the process of migrating data from a source storage media to a destination storage media.

FIG. 4 is a flow chart (300) illustrating the process of migrating data from a source storage media to a destination storage media. The migration cycle is initiated by selecting a destination storage media and assigning a name or identifier thereto (305). The process of selecting destination storage includes selecting the destination format. The destination storage media may be in the form of a tape or an electronic file. If the migration is going from a source tape to a destination tape, the destination tape must be prepared and placed in a destination deck of the system. Similarly, if the migration is going from a source tape to destination digital media, a digital media encoder must be activated to record a digital image of moving digital images and to capture the signals from the source tape. Once the type of destination media is established, the system begins to play the next available cleaned source storage media while simultaneously analyzing it using a three step real-time process (310). The system simultaneously monitors the radio frequency signal(s) of the storage media (315), the video signal (320), and the audio signal (325). Examples of data associated with the radio frequency output include but are not limited to loss of Sync and vertical internal time code (VITC). Examples of the audio signal may include but are not limited to sample frequency, bandwidth, bandwidth mean, dynamic, signal noise ration, DC offset sample mean, peak dB, energy dB, silence, and saturation. Similarly, in one embodiment, examples of the video signal include but are not limited to YUV range errors, RGB range errors, gamut range errors, digital input, picture motion, video standard, picture luminance, and picture chrominance. These are examples of elements of the signal that are identified during migration and are typically used in conjunction with the operator to provide the operator with valuable data to document the location of problems within the media. All of the captured signal data, including audio, video, and radio frequency signals, are included as process metadata for a subsequent restoration process. With respect to the radio frequency signal monitored at step (315), the system collects metadata about the signal, reports this information, and utilizes a time-based corrector to stabilize and correct any signal drop-outs or similar deficiencies with the RF signal. Similarly, with monitoring of the video signal at step (320), the system uses its video analysis tool to collect and report real-time metadata, including alarm levels and activity functions, about the video signal of the storage media. Finally, with monitoring of the audio signal at step (325), the system uses its audio analysis tool to collect and report real-time metadata, including alarm levels and activity functions, about the audio signal of the storage media. In one embodiment, the monitoring at steps (315), (320), and (325) utilizes a software-based to determine media and system condition.

Following the process of monitoring radio-frequency, video, and audio signals, the system writes the metadata of the storage media content into the system's database according to the media's time code (330) and begins migrating the video storage-media onto the stable storage means (335). While the storage media is migrating to stable storage, the system continues to clean the remaining tapes awaiting migration. This continues until the migration cycle is complete. Once is has been determined that the end of the source tape has been reached (340), the system proceeds to migration of the next tape (345). Accordingly, this process continues until each tape identified in the batch has completed the migration process.

Based on real-time analysis, the system may induce the system to perform system calibration functions if certain errors suggest that there are major problems with the tape. These calibration functions serve to proper migration of the source storage media content and that any problems lie with the source storage media and not the migration process. These calibration mechanisms exist to inform the system of any internal errors within the equipment or associated computer and to allow the system to correct these internal errors so that they will not interfere with the migration process.

Figure 5:
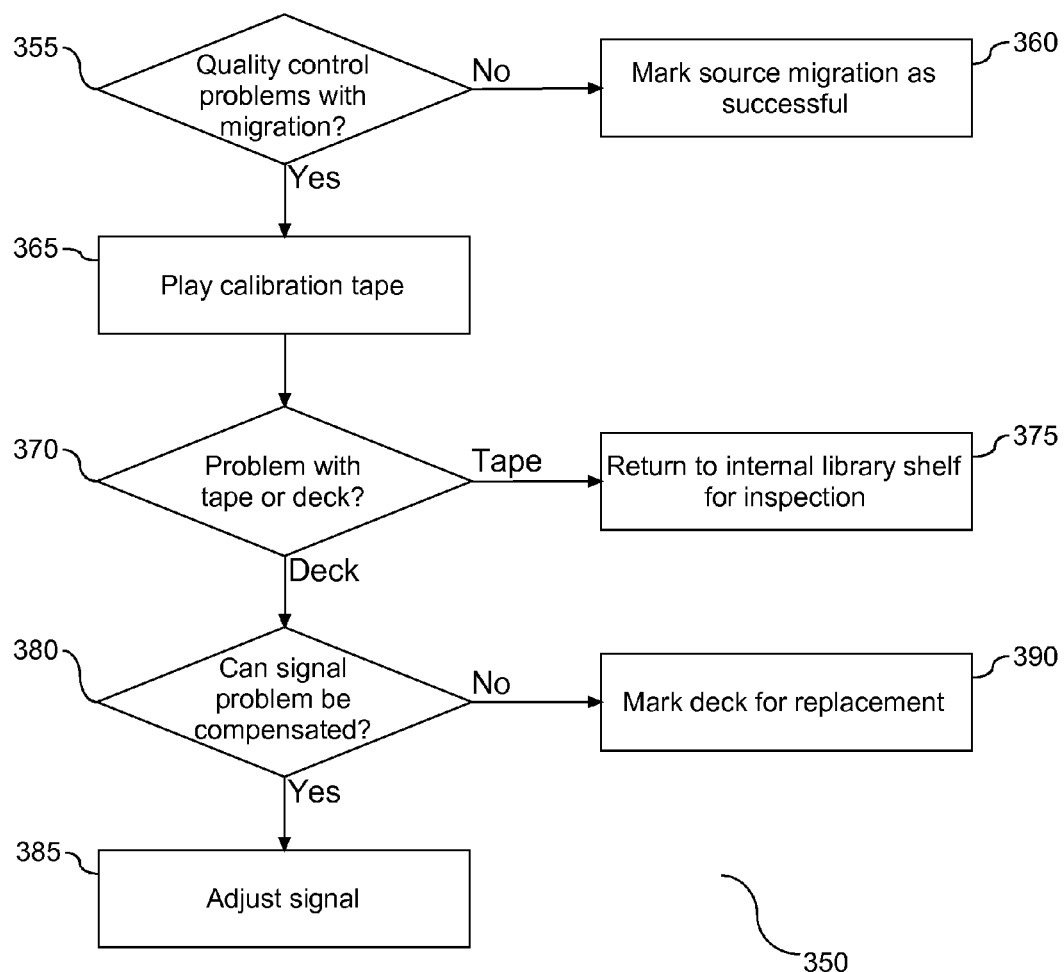
FIG. 5 is a flow chart illustrating the robotic handler inducing calibration of source storage media.

FIG. 5 is a flow chart (350) illustrating a process for calibration of source storage media responsive to a series of signal data and patterns associated therewith and obtained during the migration cycle. Initially, a determination is made if there is any quality control problems associated with the source media migration (355). If the response to the test at step (355) indicates that there are no quality control problems, the source migration is marked as successful (360). However, if the response to the test at step (355) indicates that there is a quality control problem, the system identifies and resolves a quality control problem by playing a test calibration tape (365). The calibration tape is used to identify quality control issues with respect to the radio frequency, video, and audio signals. Following step (365), a subsequent test is conducted to determine if there is a problem with the tape or the tape deck (370). If it is determined that there is a problem with the tape, the tape is then returned to the internal library of the system for further inspection (375). However, if at step (370) it is determined that there is a problem with the tape deck, a further test is conducted to determine if the signal problem in the deck can be resolved through compensation (380). A positive response to the test at step (380) will result in an adjustment of the signal to compensation for the inaccuracies during the migration (385). In one embodiment, adjustment of the signal may take the form of a time based corrector to adjust the video signal. However, a negative response to the test at step (380) will result in marking the deck for replacement (390).

One embodiment of the calibration process may be in the form of real-time analysis including rules based parameters (e.g. Noise in picture). If this occurs, then the system ejects the source media and the system replaces the source media on the shelf. Next, the system inserts a calibration tape with previously recorded and known values of test signals, plays back the calibration tape, and compares the real-time results from the source media to the results from the calibration program on the tape. This allows the system to determine if the problem was the system or the source media. If it problem is with the system, then the system uses an internal cleaning tape to clean the play deck heads and repeats the process of playing and monitoring the calibration tape. Once the system has been cleaned, then the system continues playback of the source media. If the system determines the play deck is operating within normal parameters, then the system confirms that the problem is with the source media and the source media is returned to the shelf.

If no problems occur, then upon completing the migration process, the system conducts a test to ensure that the migration was successful by performing tape quality control and/or digital file quality control measures. If the migration was unsuccessful, then the system marks the destination storage media as unsuccessful. Conversely, if the migration was successful, then the system marks the destination storage media as successful. The above automated migration steps are repeated for each individual source storage media until all source storage media which passed the inspections are loaded into the bay are migrated.

Advantages Over the Prior Art

The system and method of migration is automated through a system which efficiently separates degraded storage media from the non-degraded storage media. The system is control system having a self contained calibrated environment. Following the separation process, the system migrates large quantities of the non-degraded storage media to stable storage media. In one embodiment the source storage media is a video recorded tape and the system has a tape deck to play and record the data on the tape. Use of the system allows the system and method to continuously operate 24 hours a day, 7 days a week. Thus, the volume of storage media migration increases, while the cost of labor decreases. This, in turn, offers a cost effective means to migrate storage media at an increased productive rate.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:
1. A method of migrating data from a first source storage media comprising a first source tape to a destination storage media comprising a first destination digital storage device comprising,
    cleaning the first source tape by,
        using a sensor to inspect the first source tape at a rate faster than a first source tape play rate,
        determining particulate matter levels and defects on the first source tape, and
        adjusting a speed of a cleaning tissue;
    selecting a destination storage format;
    analyzing one or more radio frequency signals of the first source tape;
    analyzing a video signal of the first source tape;
    analyzing an audio signal of the first source tape;
    reviewing one or more of the one or more radio frequency signals, video signal, and audio signal to determine whether the first source tape was properly migrated to the first destination digital storage device;
    placing metadata relating to the cleaning and the migrating into a log;
    cleaning a second source storage media substantially simultaneously as migrating data from the first source tape to the first destination digital storage device.

2. The method of claim 1 wherein, determining particulate matter levels and defects on the first source tape comprises,
    locating a physical problem with the first source tape; and
    discontinuing migrating the first source tape to the first destination digital storage device.

3. The method of claim 1 further comprising,
migrating the second source storage media to a second destination storage media upon completion of the migration of the first source tape to a first destination digital storage device; and
cleaning a third source storage media substantially simultaneously as migrating the second source storage media to the second destination storage media.

4. The method of claim 1 further comprising, affixing an identifier to the media.

5. The method of claim 1 further comprising, using a control apparatus to,
select a media migration processing mode; and
supply instructions to a robotic handler to migrate the media from the first source tape to the first destination digital storage device.

6. The method of claim 5 wherein, the control apparatus and the robotic handler are adapted to receive missing tape information and hub tension information from the sensor.

7. The method of claim 5 wherein the control apparatus and the robotic handler are adapted to disqualify the first source tape from migration in response to detecting a physical defect with the first source tape.

8. The method of claim 5 wherein, the control apparatus and the robotic handler are adapted to analyze a timing signal.

9. The method of claim 5, wherein, the control apparatus and the robotic handler are adapted to correct errors detected on the first source tape.

10. The method of claim 5 wherein, the control apparatus comprises at least one of software, firmware, and hardware.

11. A method of migrating data from a first source storage media comprising a first source tape to a destination storage media comprising a first destination digital storage device comprising,
cleaning the first source tape by,
using a sensor to inspect the first source tape at a rate faster than a first source tape play rate,
determining particulate matter levels and defects on the first source tape, and
adjusting a speed of a cleaning tissue;
monitoring one or more migrating signals;
calibrating the first source tape by,
playing a calibration tape,
monitoring one or more calibration tape signals,
comparing the one or more calibration tape signals to the one or more migrating signals, and
identifying inaccuracies in the one or more migrating signals;
placing metadata relating to the cleaning and the migrating into a log;
cleaning a second source storage media substantially simultaneously as migrating data from the first source tape to the first destination digital storage device.

12. The method of claim 11 further comprising at least one of,
adjusting a parameter to compensate for the inaccuracies in the one or more migrating signals; and
cleaning a migration device.

13. The method of claim 11 wherein, determining particulate matter levels and defects on the first source tape comprises,
locating a physical problem with the first source tape; and
discontinuing migrating the first source tape to the destination digital storage device.

14. The method of claim 11 further comprising,
migrating the second source storage media to a second destination storage media upon completion of the migration of the first source tape to a first destination digital storage device; and
cleaning a third source storage media substantially simultaneously as migrating the second source storage media to the second destination storage media.

15. A method of automatically migrating recorded content from a first source tape to a destination digital storage device comprising,
cleaning the first source tape by,
inspecting the first source tape with a sensing device faster than a first source tape play rate,
identifying particulates and defects on the first source tape, and
adjusting cleaning tissue speed;
selecting a destination storage format;
analyzing and reviewing one or more radio frequency signals, a video signal, and an audio signal of the first source tape to determine whether the first source tape was properly migrated to the first destination digital storage device;
placing cleaning and migrating metadata into a log;
substantially simultaneously cleaning a second source storage media as migrating data from the first source tape to the first destination digital storage device.

16. The method of claim 15, further comprising, verifying that the first source tape is loaded with a robotic handler having an internal barcode scanner.

17. The method of claim 15, further comprising, physically affixing an identifier to the first source tape.

18. The method of claim 15 further comprising, supplying instructions to a robotic handler to migrate the media from the first source tape to the first destination digital storage device.

19. The method of claim 18 further comprising, using software to supply the instructions to the robotic handler.

20. The method of claim 19 further comprising, correcting errors detected on the first source tape with the software and the robotic handler.

* * * * *